United States Patent [19]
Suzuki et al.

[11] Patent Number: 5,835,107
[45] Date of Patent: Nov. 10, 1998

[54] PRINTER WITH BATTERY DISCHARGE DEVICE

[75] Inventors: Minoru Suzuki; Kiyoshi Negishi; Katsumi Kawamura; Mikio Horie; Hiroshi Orita; Katsuyoshi Suzuki, all of Tokyo, Japan

[73] Assignee: Asahi Kogaku Kogyo Kabushiki Kaisha, Tokyo, Japan

[21] Appl. No.: 469,919

[22] Filed: Jun. 6, 1995

[30] Foreign Application Priority Data

Jun. 6, 1994 [JP] Japan .................................. 6-147208

[51] Int. Cl.⁶ .................. B41J 29/393; H01M 10/44; H01M 10/46
[52] U.S. Cl. ............................. 347/19; 320/135
[58] Field of Search ................... 347/19, 171; 320/4, 320/13, 15, 48, 135, 136; 400/88; 364/707, 483; 346/145; 358/504, 406

[56] References Cited

U.S. PATENT DOCUMENTS

| | | | |
|---|---|---|---|
| 3,921,064 | 11/1975 | Mori et al. | 324/433 |
| 4,984,185 | 1/1991 | Saito | 364/707 |
| 5,312,196 | 5/1994 | Hock et al. | 346/145 |
| 5,323,100 | 6/1994 | Iketani | 320/135 |
| 5,350,995 | 9/1994 | Iketani | 320/155 |
| 5,600,231 | 2/1997 | Parker | 320/136 |
| 5,631,677 | 5/1997 | Horigome et al. | 347/19 |

*Primary Examiner*—N. Le
*Assistant Examiner*—L. Anderson
*Attorney, Agent, or Firm*—Greenblum & Bernstein P.L.C.

[57] ABSTRACT

A printer has a rechargeable battery and an electrically driven device required for printing. The device is powered by the battery. The printer uses the device as a load for discharging the battery without performing a printing operation.

7 Claims, 6 Drawing Sheets

PRINTER WITH BATTERY DISCHARGE DEVICE

BACKGROUND OF THE INVENTION

The present invention relates to a charge control device for a printer, shaving a built in internal rechargeable battery such as a nickel-cadmium or nickel-hydrogen storage battery.

Conventionally, printers having an internal rechargeable battery are known. If an external power source is available, an AC adapter supplies power to the printer. If no external power source is available, then power is supplied from an internal rechargeable battery.

Various printers have been proposed having built in batteries. Recently, there has been a demand for small portable printers for use with portable computers. Generally, the charging is carried out using charging circuits housed in the printer. Further, before the battery can be charged it must be completely discharged (hereinafter referred to as refreshed). Usually, a large current flows from the battery during the refreshing process. Consequently, the load resistors used to refresh the battery must have a large power handling capacity to dissipate the heat generated during the refreshing process.

The resistors described above will be physically large, and therefore it is difficult to reduce the overall size of the printer.

SUMMARY OF THE INVENTION

It is therefore an object of the present invention to provide an improved charge control device for a printer which can charge an internal battery of the printer, while ensuring that the printer is compact in size.

According to an aspect of the present invention, there is provided a printer having a rechargeable battery and an electrically driven device required for printing, the device being powered by the battery. The printer uses the device as a load for discharging the battery without performing a printing operation.

Therefore, no additional circuitry is required, such as load resistors, in order to discharge the battery. Thus, the number of parts, size, and cost to manufacture the printer can all be reduced.

In a preferred embodiment, the electrically driven device is a stepping motor for feeding a recording sheet of the printer on which an image is printed.

Optionally, the printer detects a voltage of the battery and stops discharging the battery when the voltage of the battery becomes a predetermined value.

Further, a number of phases of excitation of the motor can be selected in response to the detected voltage of the battery when the motor load is initially connected to the battery. Generally, the motor is single phase excited or two phase excited. If the initially detected voltage is larger than a predetermined value, then the motor is two phase excited, otherwise, the motor is single phase excited. Therefore, the time required to discharge the battery is decreased, if the initially detected voltage is large.

Alternatively, the printer determines a remaining capacity of the battery, and varies the load of the motor accordingly.128 In general the remaining capacity of the battery is determined in accordance with the detected voltage.

According to another aspect of the present invention, there is provided a printer for printing an image on a recording sheet, the recording sheet being fed by a motor. The printer includes an internal rechargeable battery and means for controlling a discharge of the battery. The discharge means connects the motor to the battery in order to discharge the battery.

Optionally, the printer further detects a voltage of the battery, and inhibits a discharge of the battery when the detected voltage of the battery reaches a predetermined value.

DESCRIPTION OF THE EMBODIMENTS

Figure 1:
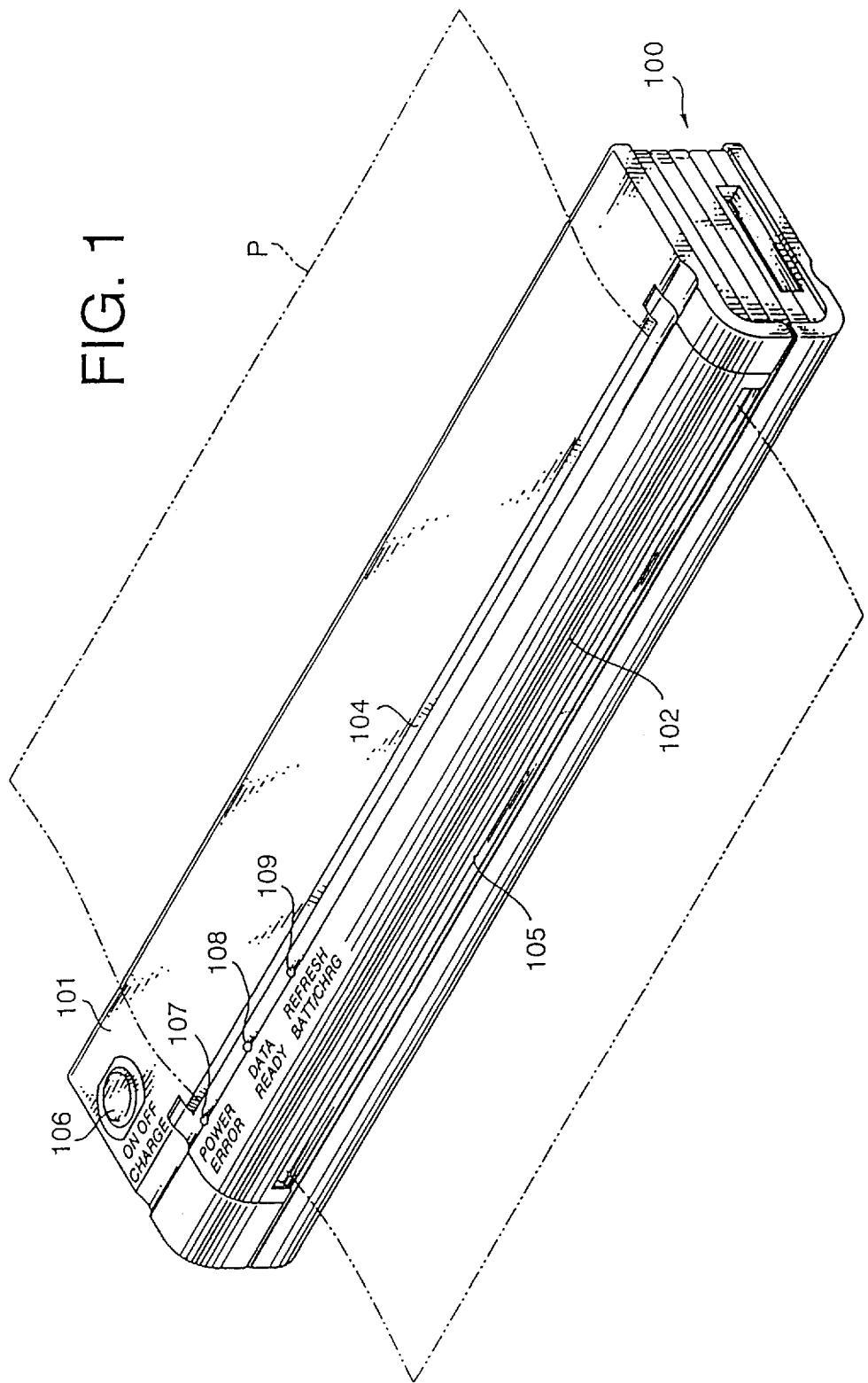
FIG. 1 shows a perspective view of a thermal printer embodying the present invention.

FIG. 1 is a perspective view of a thermal printer 100 embodying the mode control system according to the present invention. The thermal printer 100 has a main housing 101, and a platen roller cover 102. The platen roller cover 102 is hinged, and can swing to expose a platen roller (not shown).

Three indicators 107, 108 and 109 are formed on a top surface of the platen roller cover 102. In this embodiment, the three indicators 107, 106 and 109 are LEDs. The indicator 107 indicates whether the power is On or Off. The indicator 108 indicates whether data is being received. The indicator 109 indicates information about the operation of a built-in battery (not shown) in FIG. 1, such as whether the built-in battery is being refreshed or charged.

Paper used with the thermal printer 100 is fed into a slot 104 formed between the platen roller cover 102 and the housing 101. An image is formed on the paper using a thermal printing head 41 (see FIG. 2). The paper then exits the thermal printer 100 through a slot 105, formed between the platen roller cover 102 and the housing 101.

A mode switch 106 is located on the top surface of the housing 101. The model switch 106 is a push button switch and is normally open. By pressing the mode switch 106, various modes of operation of the thermal printer 100 are selected. In the embodiment, the mode switch 106 also turns the power On and Off.

Figure 2:
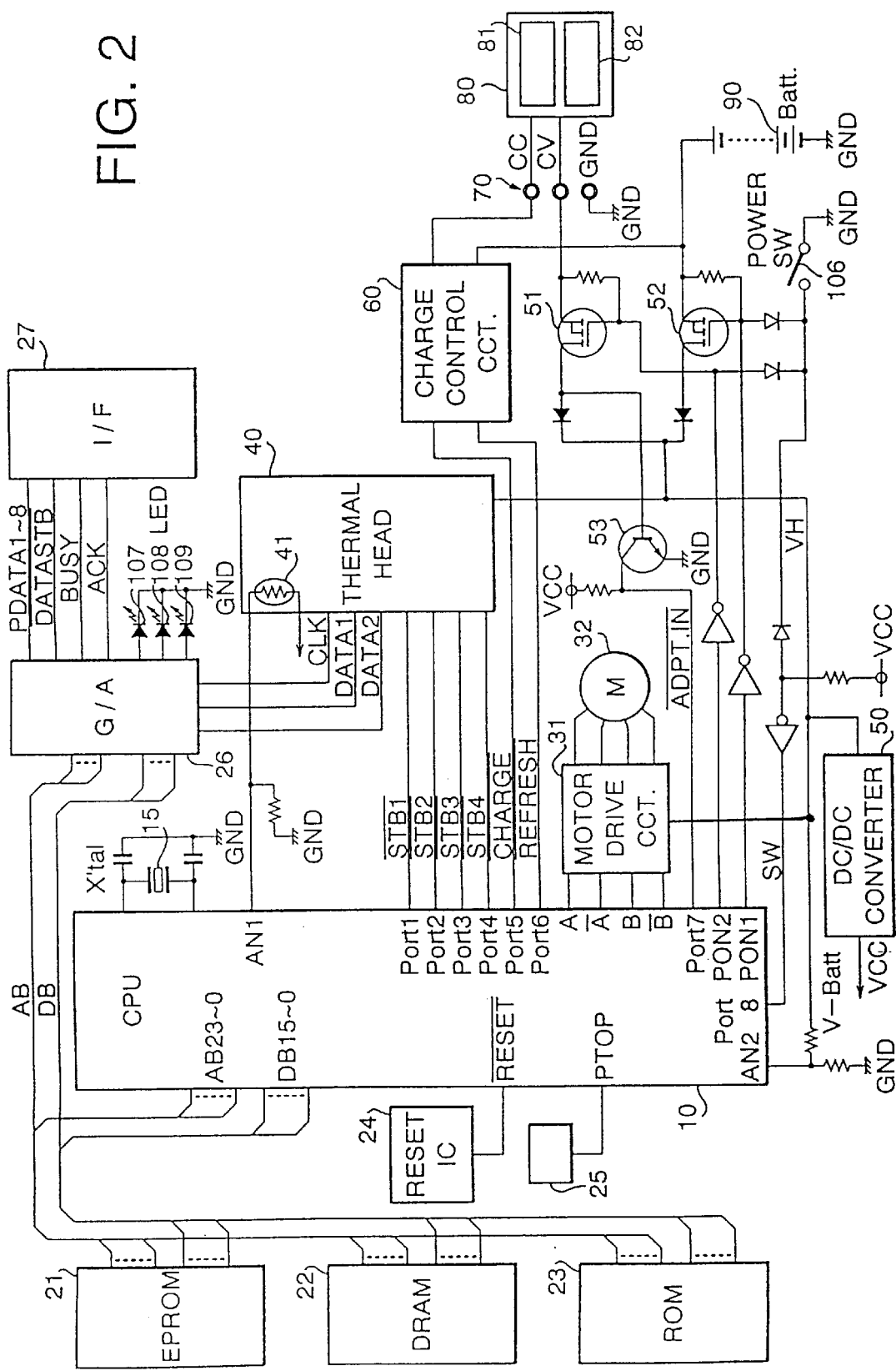
FIG. 2 shows a schematic diagram of the thermal printer shown in FIG. 1.

FIG. 2 is a schematic diagram of the thermal printer 100 shown in FIG. 1.

A CPU 10 controls an operation of the thermal printer 100. In the present embodiment, the CPU 10 is a microprocessor which can address up to 16 MB (megabytes). The CPU 10 transmits address information from address ports AB0 through AB23, along an address bus IL. The CPU 10 transmits and receives data through data ports DB0 through DB15 and a data bus DB. The CPU 10 is connected to an EPROM 21, a DRAM 22, a font ROM 23, and a gate array 26, via the address bus AB and data bus DB.

The EPROM 21 stores data and software that control printer performance, as well as an initial operation of the thermal printer 100 when the power is turned On. The DRAM 22 (dynamic RAM) has an area where a bit-map of the image is developed, an area for storing data transmitted through an interface 27, and some other work areas. The font ROM 23 stores font data used for developing the bit-mapped image that is stored in the DRAM 22.

The CPU 10 uses a gate array 26 to exchange data through the interface 27, and drive the indicators 107, 108 and 109.

The interface 27 is a printer interface (e.g. Centronics interface) which receives print data and control data from a host computer (not shown). The printer interface has eight data lines PDATA 1 through PDATA 8, and three control lines $\overline{\text{DATASTB}}$, BUSY, and ACK. The eight data lines PDATA 1 through PDATA 8 are used to transfer the print data from the host computer. The $\overline{\text{DATASTB}}$ control line initiates input of data to the printer 100 from the host computer. The BUSY control line indicates that the printer 100 cannot accept the print data, while the ACK control line acknowledges reception of the print data. In the specification, a control line, port or signal having a "bar" over its name indicates an active low control line, port or signal, respectively.

A divided voltage V_BATT of the built-in battery (or an external DC voltage) is applied to an analog port AN2 of the CPU 10. The CPU 10 A/D converts the applied analog voltage to a digital value, and detects the voltage of the built-in battery (or external DC source). This detected voltage is used for preventing excess discharge of the built-in battery during printing. The voltage of the built-in battery is detected by the charge control circuit 60, described later. As the charge control circuit 60 and the built in battery are positioned close to each other, the possibility of noise interference during the voltage detection is minimized.

A reset IC 24 transmits a reset signal ($\overline{\text{RESET}}$) to a CPU port $\overline{\text{RESET}}$, when the detected voltage level of the battery is lower than a predetermined voltage level. When the $\overline{\text{RESET}}$ signal is LOW, the CPU 10 stops operation of the printer 100. Therefore, the printing operation stops when the voltage of the built-in battery (or external DC voltage) is below the predetermined level.

A sensor 25, mounted on the platen roller cover 102, detects the presence of the thermosensitive paper in a sheet feed path of the printer 100. If the thermosensitive paper is located in the sheet feed path, the sensor 25 transmits a paper-detect signal to a port PTOP of the CPU 10. By monitoring the port PTOP, the CPU 10 determines whether the printer 100 has thermosensitive paper loaded in the sheet feed path, and therefore whether the printer 100 is ready to start the printing operation.

A reference clock signal CLK is generated by crystal 15. In accordance with, the reference clock signal CLK, the bit map of the print data is developed in the DRAM 22. The data written in the DRAM 22 is transmitted to the gate array 26 and synchronized with the reference clock signal CLK, before being transferred to the thermal print head 40. The data transferred to the thermal head 40 is separated into two separate data blocks: DATA1 and DATA2.

The thermal print head 40 has a plurality of thermal elements. The heat energy generated by each of the thermal elements is controlled by strobe signals $\overline{\text{STB1}}$, $\overline{\text{STB2}}$, $\overline{\text{STB3}}$, $\overline{\text{STB4}}$ (described later), which are transmitted from the ports Port 1 through Port 4 of the CPU 10. Thus, DATA1 and DATA2 identify the thermal elements to be driven, and strobe signals $\overline{\text{STB1}}$ through $\overline{\text{STB4}}$ drive the identified thermal elements to generate the required heat energy for printing the image.

A thermistor 41 is provided on the thermal head 40 for detecting the temperature of the thermal head 40. The output of the thermistor 41 is input to a port AN1 of the CPU 10. The CPU 10 A/D-converts the signal input to the port AN1, and detects the temperature of the thermal head 40.

A motor driving signal is transmitted from Ports A, $\overline{\text{A}}$, B, $\overline{\text{B}}$, for controlling a motor driving circuit 31. The motor driving circuit 31 drives a motor 32. The motor driving circuit 31 will be described in more detail later.

A port PON1 outputs a signal for turning ON or OFF a FET 52. A port PON2 outputs a signal for turning ON or OFF a FET 51. If an external power source (such as an AC adapter) powers the printer 100, a transistor 53 is turned ON thereby changing the signal $\overline{\text{ADPT.IN}}$ from High to Low. The CPU 10 monitors the $\overline{\text{ADPT.IN}}$ signal at Port 7, and determines whether the external power supply is connected. If the external power supply is connected (i.e., $\overline{\text{ADPT.IN}}$ is Low), then the CPU 10 drives the FET 51 through port PON2. If the external power-supply is not connected (i.e., $\overline{\text{ADPT.IN}}$ is High), then the CPU 10 drives the FET 52 through port PON1.

When the switch 106 is first turned ON, the FET 51 or the FET 52 is turned ON, depending on whether power is supplied from the external power source or the built-in battery, respectively,. to a DC/DC converter 50. The DC/DC converter 50 outputs Vcc which powers the CPU 10, the EPROM 21, the DRAM 22 and the RON 23. In this embodiment, Vcc=5V.

When the FETs 51 and 52 are turned OFF by the signals output from the Ports PON1 and PON2, power is not supplied to the DC/DC converter SO. Therefore, the power to the CPU 10 is cut off and the printer 100 is turned OFF. To turn ON the printer 100, it is necessary to press the switch 6 again, thereby providing power to the FETs 51 and 52.

The built-in battery 90 is a rechargeable battery, such as a Nickel Cadmium battery. The battery 90 supplies 14.4 VDC to the printer 100. A power source connector 70 is provided to connect the external power source, such as an AC adapter 80, to the printer 100. The AC adapter 80 includes a constant current source 81 and a constant voltage source 82. An output of the constant current source 81 is connected to a battery charge control circuit 60, and is used to recharge the battery 90. An output of the constant voltage source 82, is connected to an input of the DC/DC converter 50.

As described above, the constant current source 81 is provided in the AC adapter 80, and not in the printer 100, since the constant current source 81 is only required for charging the battery. Therefore, the size and weight of the printer 100 is reduced.

In order to a minimize the efficiency of charging the battery 90, the battery 90 is first refreshed (completely discharged) before being recharged. This reduces the 'memory' effect of the battery 90. The memory effect of a battery occurs when the battery is recharged without first being fully discharged. For instance, if the battery is repeatedly recharged when the remaining capacity is 60%, then the usable capacity of the battery becomes 40%. Therefore, the capacity of the battery is decreased.

In the present embodiment, the refreshing of the battery 90 is controlled by the charging circuit 60. When the battery 90 is to be refreshed, the CPU 10 transmits a $\overline{\text{REFRESH}}$ signal from the Port 6 to the charge control circuit 60. The charge control circuit 60 stops charging the battery 90, the FET 51 is turned OFF, and the FET 52 is turned ON. The FET 52 connects the battery 90 to a load to refresh (i.e., completely discharge) the battery 90.

In the embodiment, the charging of the battery 90 is also controlled by the charging circuit 60. When the battery is to be charged, the CPU 10 transmits a $\overline{\text{CHARGE}}$ signal from the Port 5. The charge control circuit 60 starts charging the battery 90 using the constant current source 81 of the AC adapter 80. The voltage of the battery 90 is monitored by the CPU 10, to determine when to stop the charging operation. More specifically, when a nickel cadmium battery is being charged, the voltage of the battery increases to a certain value, and then decreases slightly when the battery is fully charged. B detecting this change in the voltage characteristic, the CPU 10 can determine when to stop charging the battery.

The thermal head 40 has 2560 thermal elements arranged along a line, having al length equivalent to a width of one sheet of the thermosensitive paper used in the printer 100. Print data for the first through the 1280st thermal element are grouped as the DATA1, while print data for the 1281st through the 2560th thermal element are grouped as the DATA2. Further, as described above, the data DATA1 and DATA2 are transferred to the thermal head 40 synchronously with the reference clock signal CLK.

The thermal elements are divided into four groups, with each group driven by the strobe signals $\overline{\text{STB1}}$, $\overline{\text{STB2}}$, $\overline{\text{STB3}}$, and $\overline{\text{STB4}}$, respectively. With this arrangement the number of thermal elements driven at one time may be varied in accordance with the power available form the battery 90. If the power available from the battery 90 is low, then each group of thermal elements may be driven sequentially. However, if the battery 90 is fully charged or the AC adapter 80 is used, all four groups of thermal elements may be driven simultaneously.

The printer 100 according to the embodiment has three modes of operation. These modes of operation are: a print mode M1, a refresh mode M2 and a charge mode M3. The selection of the three modes, as well the turning ON and OFF of the power, are controlled by the switch 106.

Figure 3:
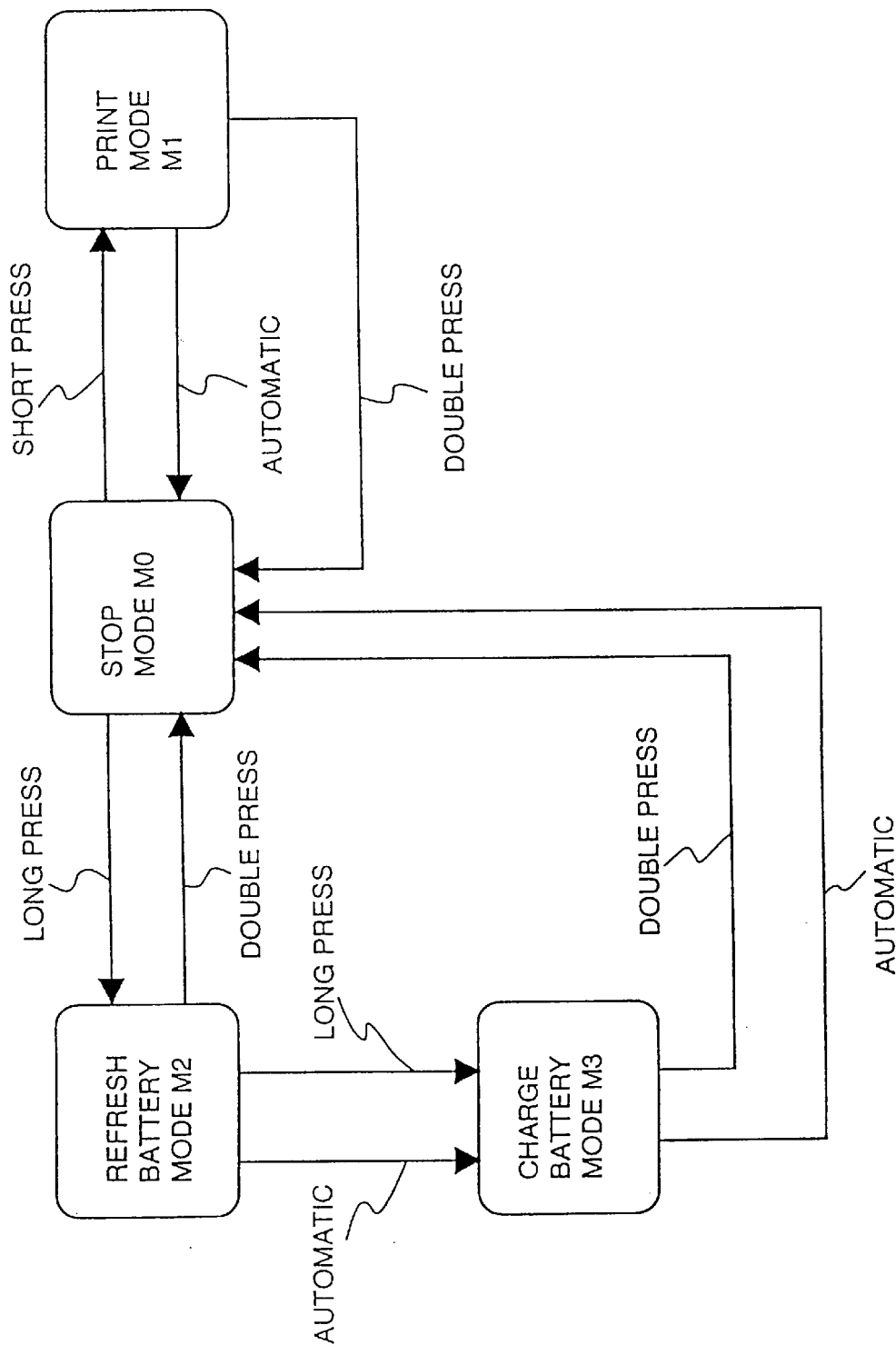
FIG. 3 shows a diagram of the operation of the mode control system according to the present invention.

FIG. 3 shows a diagram of the operation of the three modes mentioned above. Further, the printer 100 also has a stop mode M0, in which the power is turned OFF. In order to switch from one mode to another, the switch 106 is pressed for a short time (i.e., a short press of less than 500 msec.), a long time (i.e., a long press of more than 1 sec.) or pressed two times in quick succession (i.e., a double press). The operation (duration and number of presses) of the switch 106 is detected at the Port 8 of the CPU 10.

As shown in FIG. 3, if the printer 100 is in the stop mode M0 and the switch 106 receives a short press, the printer 100 is set to the print mode M1; the power to the printer 100 is turned ON, and the printer 100 is ready to print data. However, if the printer 100 receives a long press while in the stop mode M0, the printer 100 is set to the refresh mode M2 in which the battery 90 is refreshed (i.e., completely discharged). If the switch 106 is not pressed again, the printer 100 is automatically set to the charge mode M3, where the battery 90 is charged. If the printer 100 is in any of the three modes M1, M2 or M3 and the switch 106 receives a double press, the printer 100 is set to the stop mode M0 and the power is turned off.

In the refresh mode M2, if the switch 106 receives a long press, the refresh mode M2 is terminated and the printer 100 is set to the charge mode M3. In the charge mode M3, the CPU 10 monitors the voltage of the battery 90; and when the CPU 10 determines that voltage of the battery 90 has reached a predetermined value, the charging of the battery 90 is completed. The charge mode M3 is then terminated and the printer 100 is automatically set to the stop mode M0.

In the print mode M1, if no data or change in mode of operation is received by the printer 100 during a 60 second interval, the printer 100 is automatically set to the stop mode M0 and the power is turned OFF.

Figure 4:
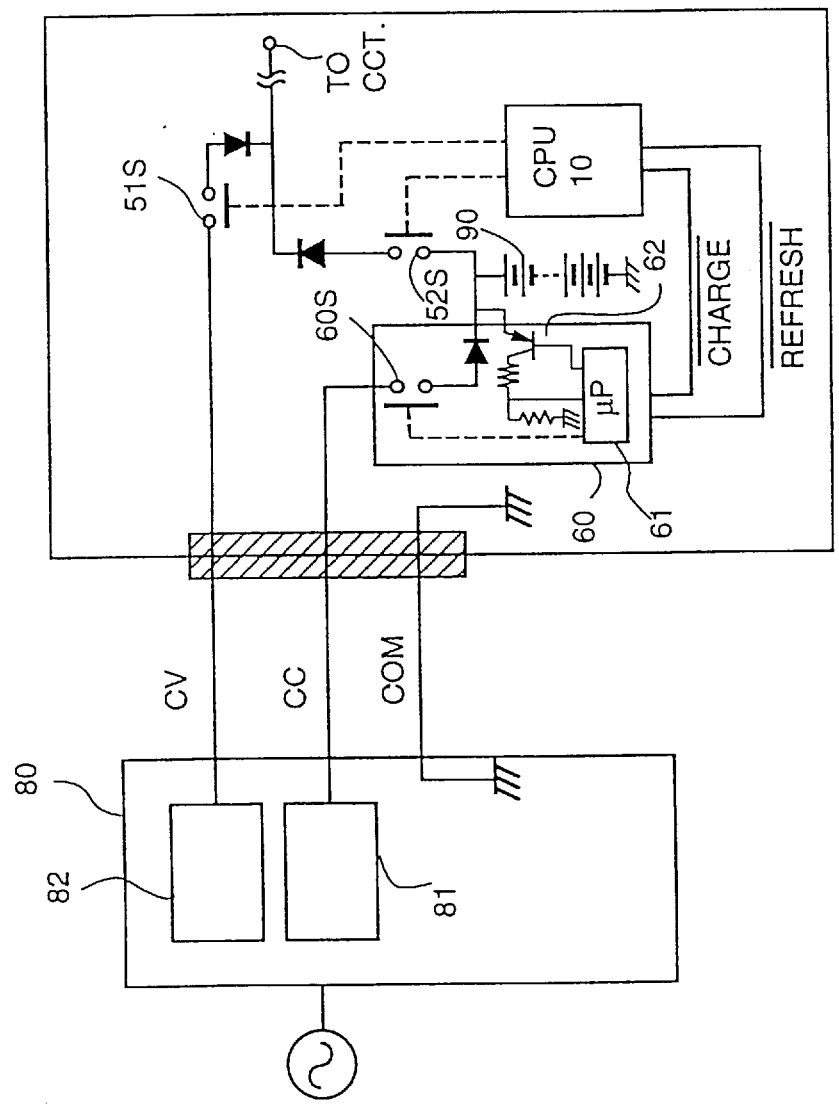
FIG. 4 shows a schematic diagram of the charging system of the thermal printer shown in FIG. 2.

FIG. 4 is a schematic diagram showing the connection of the AC adapter 80, the charge control circuit 60 and the CPU 10, which constitute the charging system in the present embodiment. In the schematic of FIG. 4, the FETs 51 and 52 are shown as switches 51S and 52S, respectively.

Charge control circuit 60 has a switch 60S and a microprocessor $\mu$P. The microprocessor $\mu$P controls the operation of the switch 608 based on the signals $\overline{\text{CHARGE}}$ and $\overline{\text{REFRESH}}$ sent from the CPU 10.

When the battery 90 is to be refreshed, the microprocessor $\mu$P turns switch 60S OFF, thereby disconnecting the constant current source 81 from the charging circuit 60. Further, the CPU 10 turns the switch 51S OFF and turns the switch 52S ON, to connect the battery 90 to the circuits of the printer 100. More specifically, the motor 32 of the printer 100 is connected to the battery 90, and provides a load for refreshing the battery.

If the constant voltage source 82 is connected to the printer during the refresh mode of operation, the applied voltage from the constant voltage source 82 will operate the printer when the voltage of the battery falls below 14.4V. This prevents the battery from being further discharged. Therefore, in the refresh mode (and only in this mode), the FET 51S is turned OFF to completely discharge the battery 90.

When the battery 90 is to be charged. the CPU 10 turns the switch 51S ON. Thus, the constant voltage source 82 supplies a constant voltage to the charge control circuit 60. Further, switch 52S is turned OFF thereby disconnecting the battery 90 from the circuits of the printer 100. However, the microprocessor $\mu$P turns on switch 60S to connect battery 90 to the constant current source 81. Thus, the constant current (CC) is applied to the battery 90, to charge the battery 90. The microprocessor $\mu$P turns the transistor 62 ON to detect the voltage across the battery 90 during the charging operation.

An operation of the CPU 10 and the charge control circuit 60 will be described with reference to FIGS. 5 and 6.

Figure 5:
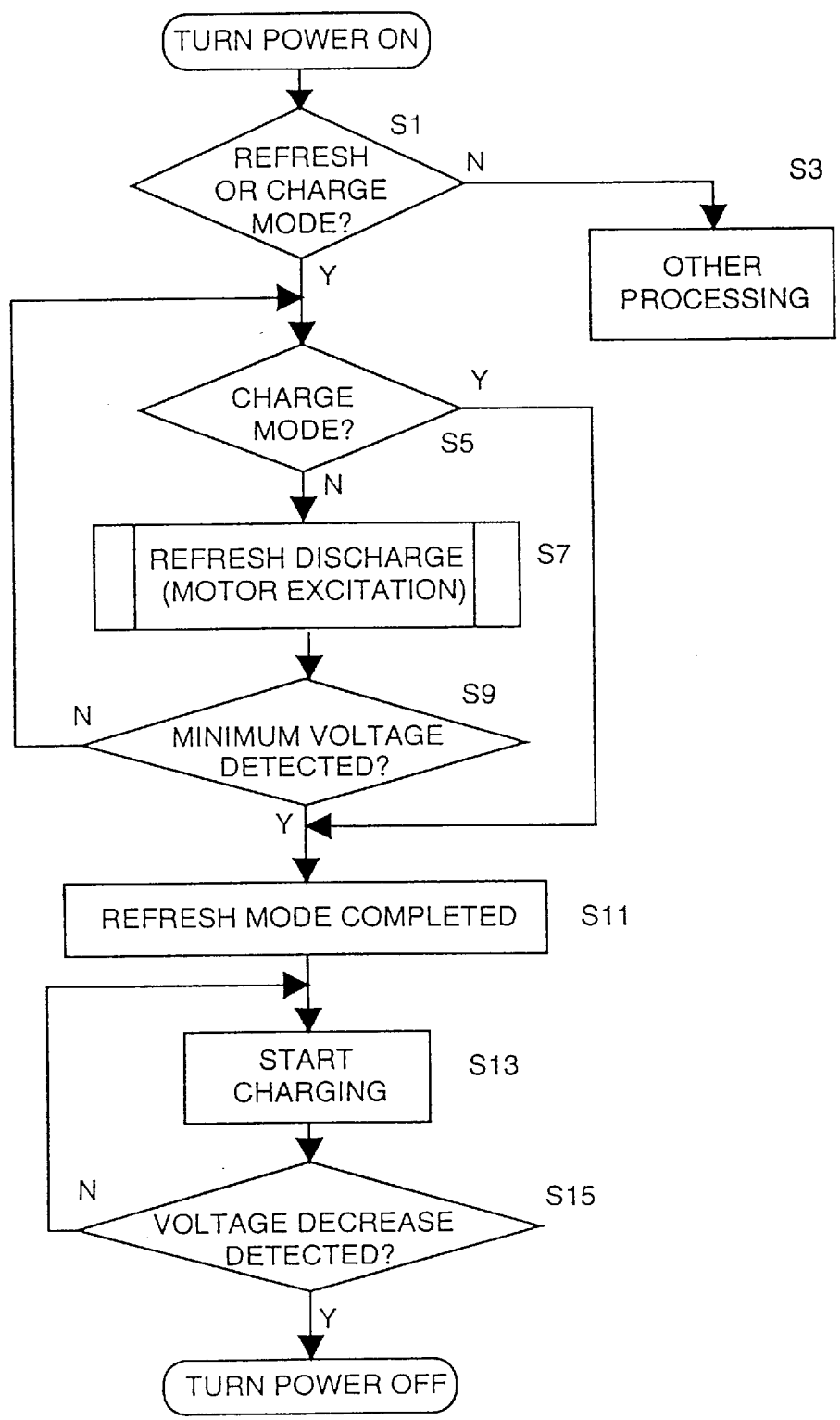
FIG. 5 shows a flowchart of an operation of a CPU of the thermal printer shown in FIG. 1.

FIG. 5 shows a flowchart of an operation of the CPU 10 during the refreshing of the battery. As described above, the refresh mode is entered by depressing the switch 106 for longer than one second. In order to initiate the charging mode, the switch 106 is depressed again for more than one second when the printer operates in the refresh mode. In step S1, the CPU 10 determines if the refresh mode or the charge has been entered.

If the mode of operation is not the refresh mode or charge mode (S1:N), then other processing is performed in step S3. otherwise, the CPU 10 proceeds to step S5.

Step S5 determines whether the charge mode is selected (i.e., the switch 106 was again pressed for longer than one second). If the charge mode is selected (S5:Y), control proceeds to step S11. If the charge mode is not selected (S5:N), control proceeds to step 57 to refresh/discharge the battery (described later and shown in FIG. 6).

After the battery has been refreshed, step S9 determines whether a minimum voltage (predetermined terminal voltage) was detected. If the minimum voltage is not detected, then control repeats steps S5 through S9 to discharge the battery. When the minimum voltage is detected, then the refresh mode is completed in step S11.

Thus, if the charge mode is selected when the printer operates in the refresh mode (S5:Y), even though the minimum voltage is not detected, the refresh mode is completed, (i.e., the discharging of the battery is terminated) in step S11.

In step S13, the charging of the battery is started. In the embodiment a nickel cadmium (nicad) battery is employed. The nicad battery has a characteristic such that as it charges, the voltage of the battery increases to a maximum, and then decreases slightly when the battery is fully charged. Therefore, by detecting the decrease in the voltage of the battery 90, in step S15, the CPU 10 determines whether the battery has been fully charged. If the decrease in the voltage is not detected (S15:N), then charging of the battery continues. If the decrease in the voltage is detected (S15:Y), then charging is complete and the power is turned off.

Figure 6:
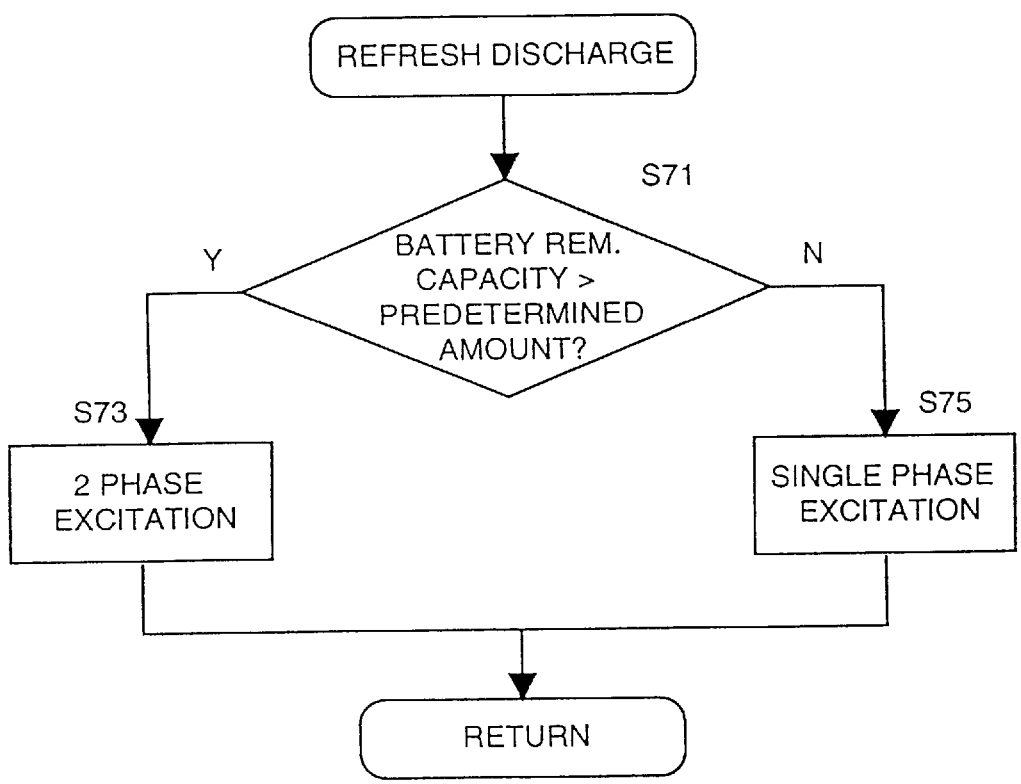
FIG. 6 shows a flowchart of an operation of a refresh processing subroutine of the thermal printer shown in FIG. 1.

FIG. 6 shows a flow chart of the refresh discharge processing. In the present embodiment, the refresh/discharge of the battery 90 is carried out by placing a load across the battery 90. In this case, the motor 32 is energized to discharge the battery 90. For a nicad battery, if a predetermined load is connected across the battery, almost all of the energy stored in the battery can be discharged. In this embodiment, the charge control circuit 60 controls the discharge current flowing from the battery to the motor 32, such that the discharge current remains constant during the refreshing process. Further, by changing the number of phases of excitation of the motor 32, the effective load across the battery can be changed, causing a corresponding change in discharge current. Therefore, depending on the level of energy stored in the battery 90, different discharge currents may be selected by changing the number of phases of excitation of the motor 32.

As shown in FIG. 6, step 71 of the refresh/discharge process determines whether the remaining capacity of the battery 90 is greater than a predetermined amount (based on the maximum voltage of the battery). If the remaining capacity of the battery 90 is greater than the predetermined amount (S71:Y), then step S73 sets the motor 32 to a two phase excitation, thereby increasing the load across the battery 90. Otherwise, step S25 sets the motor 32 to single phase excitation. Then the refresh/discharge process ends.

As described above, the motor 32 is energized to completely discharge the battery 90. Therefore, a load resistor is not required to discharge the battery. Further, by varying the number of phases of excitation of the motor 32, the load current can be varied; a battery having a large remaining capacity can discharge at a higher rate, decreasing the time required for refreshing the battery.

What is claimed is:

1. A printer having a rechargeable battery comprising:

an electrically driven device required for printing, said device being powered by said battery;

a discharging system which discharges said battery, said discharging system using said device as a load for discharging said battery without printing;

a detecting system which detects a voltage of said battery; and a refresh system which stops discharging said battery when said detecting system detects that said voltage of said battery reaches a predetermined value;

wherein said electrically driven device is a motor for feeding a recording sheet used in said printer, and wherein said refresh system includes a system which selects a number of phases of excitation of said motor in response to the voltage of said battery detected by said detecting system, when said motor load is initially connected to said battery.

2. The printer according to claim 1, further comprising a selecting system for selecting one of a plurality of modes of operation, said plurality of modes of operation including a refresh mode for completely discharging said battery with said discharge system, and an image mode for printing an image.

3. The printer according to claim 1, wherein said motor is a stepping motor.

4. The printer according to claim 1, further comprising a system for determining a remaining capacity of said battery, said discharging system applying a first predetermined load value on said battery if said remaining capacity of said battery is less than or equal to a predetermined value, and said discharging system applies a second predetermined load value on said battery if said remaining capacity of said battery is greater than said predetermined value.

5. The printer according to claim 4, wherein said remaining capacity of said battery is determined in accordance with said voltage detecting systems.

6. The printer according to claim 1, further comprising a system for determining a remaining capacity of said battery, wherein a load value of said device is determined in accordance with said remaining capacity.

7. The printer according to claim 6, wherein said load value of said device decreases as said remaining capacity of said battery decreases.

* * * * *

UNITED STATES PATENT AND TRADEMARK OFFICE
CERTIFICATE OF CORRECTION

PATENT NO. : 5,835,107
DATED : November 10, 1998
INVENTOR(S) : MINORU SUZUKI et al.

It is certified that error appears in the above-identified patent and that said Letters Patent is hereby corrected as shown below:

At column 8, line 42 (claim 5, line 3) of the printed patent, "systems" should be ---system---.

Signed and Sealed this

Fourteenth Day of March, 2000

Q. TODD DICKINSON

*Attest:*

*Attesting Officer*  *Commissioner of Patents and Trademarks*